United States Patent [19]

Chin et al.

[11] 4,390,902
[45] Jun. 28, 1983

[54] TUNING DISPLAY FOR A TELEVISION RECEIVER

[75] Inventors: Danny Chin, Plainsboro; John G. N. Henderson, Princeton; Robert J. Maturo, Bricktown, all of N.J.

[73] Assignee: RCA Corporation, New York, N.Y.

[21] Appl. No.: 315,617

[22] Filed: Oct. 28, 1981

[51] Int. Cl.³ .............................................. H04N 5/50
[52] U.S. Cl. .................................. 358/192.1; 358/183
[58] Field of Search ................... 358/192.1, 10, 81, 22, 358/183, 188; 455/154, 159; 334/33, 86, 87; 340/722, 723, 709, 730, 734, 724

[56] References Cited

U.S. PATENT DOCUMENTS

| | | | |
|---|---|---|---|
| 3,812,285 | 5/1974 | Miyata et al. | 178/5.8 |
| 3,911,418 | 10/1975 | Takeda | 340/324 AD |
| 3,984,828 | 10/1976 | Beyers | 340/324 AD |
| 4,025,945 | 5/1977 | Bridgewater | 358/1 |
| 4,081,797 | 3/1978 | Olson | 340/324 AD |
| 4,214,273 | 7/1980 | Brown | 358/192.1 |
| 4,241,361 | 12/1980 | Kamiya | 358/10 |
| 4,338,624 | 7/1982 | d'Hautecourt et al. | 358/22 |

FOREIGN PATENT DOCUMENTS

2432600 of 0000 Fed. Rep. of Germany .
1593424 7/1981 United Kingdom .

OTHER PUBLICATIONS

Direct Address Television Tuning and Display System using Digital MOS Large Scale Integration, by Evans et al., IEEE Transactions on Consumer Electronics, vol. CE-22, No. 4, pp. 267-288, Nov. 1976.
Sony KV-4000 Schematic Diagram and Operation Manual, pp. 10-15, 1980.
Hitachi CT0911 Service Manual, Jan. 1981.
RCA Television Service Data, CTC 107, File 1981-C-2, pp. 1-4, 8-14, 21, 24-29, 33; and Supplement File 1981-C-S2, pp. 1-6.
RCA Television Service Data CTC-81B, File 1975-C-9, pp. 1, 16-20, 23-24.

Primary Examiner—Tommy P. Chin
Attorney, Agent, or Firm—E. M. Whitacre; P. J. Rasmussen; C. A. Berard, Jr.

[57] ABSTRACT

A television (TV) receiver which receives TV signals in a plurality of TV frequency bands includes apparatus for developing an accentuated and uncontaminated on-screen tuning indication. Specifically, a blanking device is responsive to a tuning signal for eliminating the display of a portion of the TV picture for the duration of a pulse signal. The pulse signal is delayed in time relative to a deflection signal by a time related to the tuning signal so that a blanked bar is generated in the TV picture. A tuning indicator device causes a predetermined display unaffected by the TV picture during the blanked portion of the TV picture.

10 Claims, 3 Drawing Figures

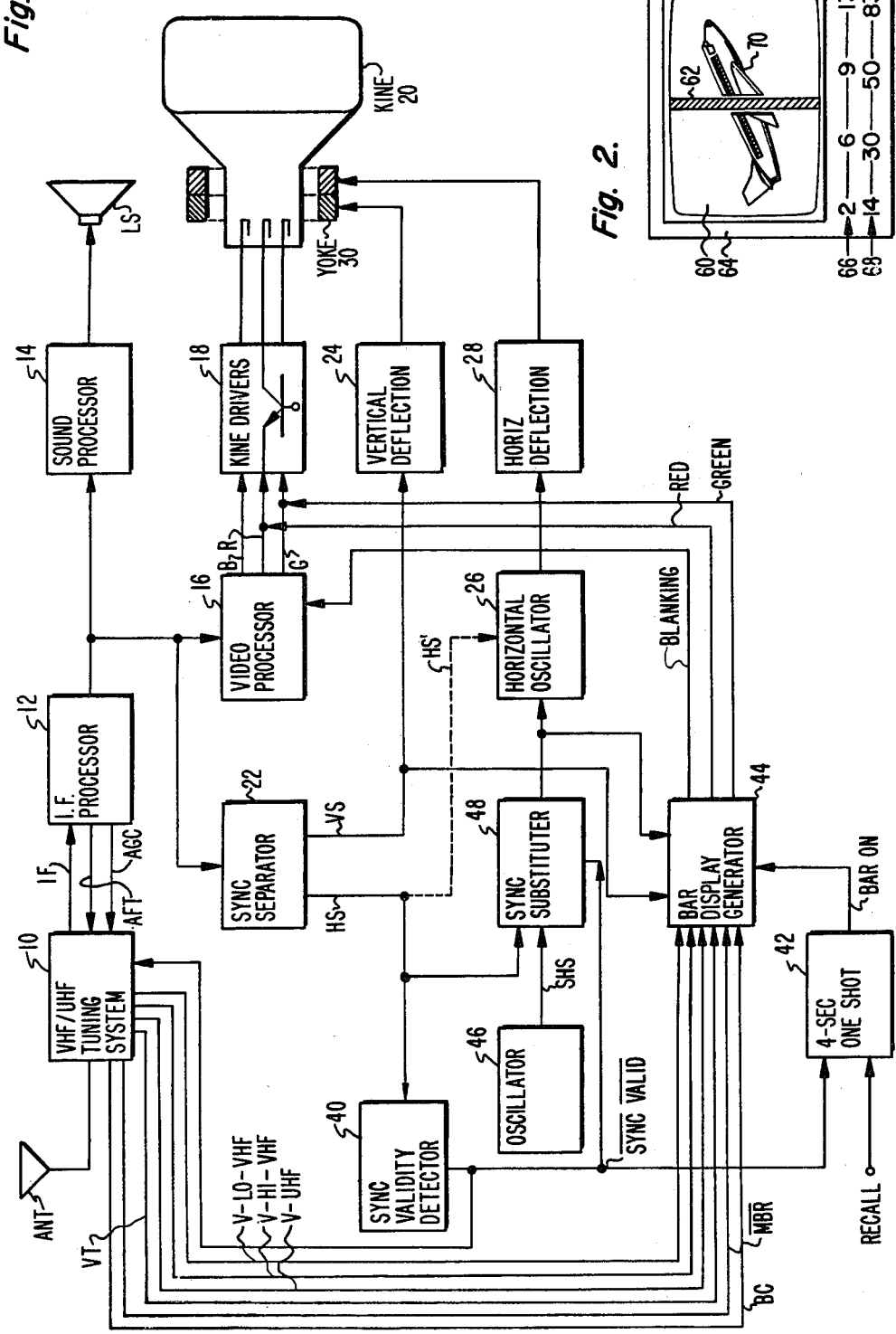

TUNING DISPLAY FOR A TELEVISION RECEIVER

The present invention relates to tuning indicators for television receivers and, in particular, for blanking in relation to tuning indications displayed on the television screen.

In some television (TV) receivers, in particular, those providing for remote-controlled operation by a viewer, an on-screen display tuning indication is a desirable feature. When the on-screen display is merely superimposed over the displayed TV picture the tuning indication is not always clearly displayed. Moreover, when a channel is being acquired or the received signal is weak, picture synchronization is erratic so that the display, if legible at all, exhibits an undesirable jagged and erratic appearance. That is particularly undesirable in TV receivers having scanning-type tuning systems because the viewer often decides whether to continue or stop scanning based upon an evaluation of the presently received picture.

TV receivers marketed with premium features often provide an alpha-numeric on-screen display of channel number along with, for example, time or date information. One display of that sort which generates on-screen alpha-numeric characters having contrasting blanked edges is described in U.S. Pat. No. 3,984,828 entitled CHARACTER GENERATOR FOR TELEVISION CHANNEL NUMBER DISPLAY WITH EDGING PROVISIONS. The characters are located at a fixed, predetermined position. Tuning systems employed with such displays commonly include keyboard controls, frequency synthesizers and/or tuning memories to provide premium performance. Exemplary TV receivers of that sort include models FFR 495W (LED display) and FFR 488WR (on-screen display) marketed by RCA Corporation and respectively described in RCA Television Service Data Chassis CTC-111 Series, Files 1981 C-3 and C-3-S2. Because such tuning systems and their associated display character generators necessarily are complex to provide the flexibility and convenience associated with the premium features found in premium TV receivers, they tend to be higher in cost and are therefore not suitable for use with lower-cost, more basic TV receivers. Thus, for a basic TV receiver, a simple and low-cost tuning indicator is desirable.

Some tuning indicators employ a horizontal or vertical bar displayed on-screen in a position which is indicative of the channel selected. U.S. Pat. No. 4,241,361 entitled TUNING VOLTAGE DISPLAY DEVICE FOR A COLOR TELEVISION RECEIVER WITH AN ELECTRONIC TUNER describes a display of that sort. Because the bar therein is generated by merely applying a pulse to one of three primary color output transistors and the video (luminance) signal remains applied to all three output transistors, video information is displayed in the same position as is the bar. As a result, the bar appears contaminated or "washed out" by the TV picture. Even if the luminance signal were to be maximized or minimized (e.g., towards a white or black level), as suggested by DT No. 24 32 600 (West Germany), video information therein could still tend to contaminate the displayed indication with underlying TV picture information. The foregoing problems are overcome by the present invention.

Thus, known on-screen displays are either too complex and costly, or they produce displays having inferior appearance. They do not provide the advantages of simplicity and low-cost and the accentuated, non-contaminated appearance associated with the on-screen display of the present invention.

Accordingly, the apparatus of the present invention comprises a blanking device responsive to a tuning signal for eliminating the display of the portion of the picture during a pulse signal duration delayed from a deflection signal by a time delay related to the tuning signal. A tuning indicator device causes a predetermined display unaffected by the picture by applying a signal to the display device during the pulse signal duration.

In the drawings:

FIG. 1 is a schematic block diagram of a TV receiver including the present invention;

FIG. 2 is a view of a television display; and

Figure 3:
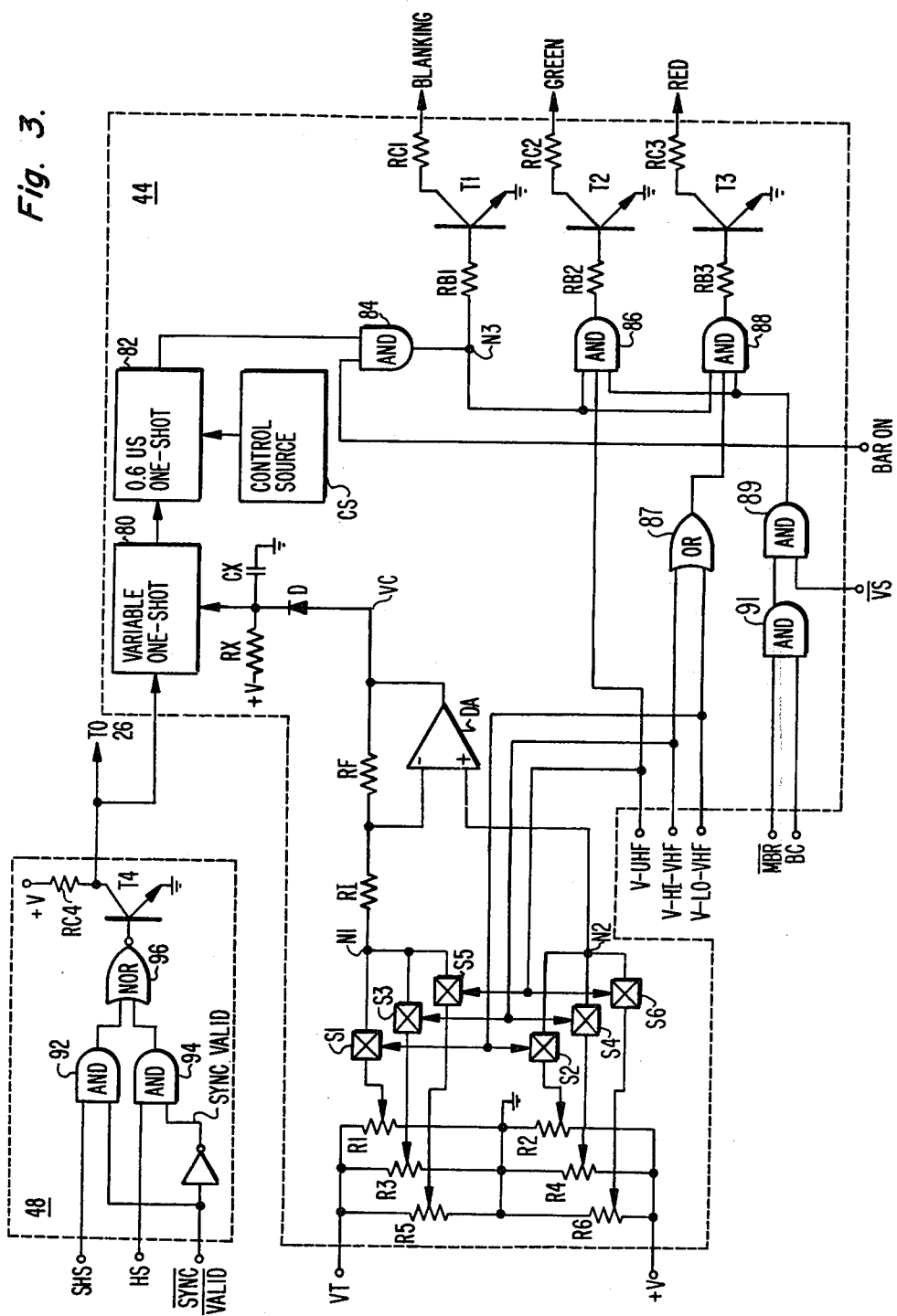
FIG. 3 is a diagram partially in schematic and partially in block diagram form of apparatus useful in the TV receiver of FIG. 1.

In the TV receiver shown in FIG. 1, TV signals are received through antenna ANT by tuning system 10 for TV signals including, e.g., channels 2-13 in the VHF-TV frequency band and channels 14-83 in the UHF-TV frequency band. Tuning system 10 develops band signals V-LO-VHF, V-HI-VHF and V-UHF to select the one of the lower VHF, upper VHF or UHF bands, respectively, in which the selected TV signal channel is included. Tuning system 10 further develops tuning voltage VT in response to which it specifically tunes the selected TV signal in that band. IF signals from tuning system 10 are applied to IF processor 12 which develops automatic fine tuning (AFT) and automatic gain control (AGC) signals for controlling tuning system 10 and further develops a composite video signal.

Sound processor 14 develops from the composite video signal audio program information which is reproduced by loudspeaker LS.

Video processor 16 develops video signals in response to the composite video signal. In a color TV receiver in particular, video processor 16 develops blue (B), red (R) and green (G) color video signals responsive to the chrominance information in the composite video signal, each of which color video signals further includes luminance information. Kine drivers 18 couple the B, R and G color video signals to corresponding electrodes of kinescope display tube 20 upon which color picture information is displayed.

Sync separator 22 develops vertical synchronization signal VS which is applied to vertical deflection circuits 24 for developing periodic vertical deflection signals for driving the vertical deflection portion of yoke 30. Horizontal synchronization signal HS developed by sync separator 22 is conventionally applied via phantom path HS' for synchronizing horizontal oscillator 26 which drives horizontal deflection circuits 28 for developing periodic horizontal deflection signals in the horizontal portion of yoke 30.

A picture program display is developed on the screen of kinescope 20 in response to the B, R and G color video signals and the vertical and horizontal deflection signals. The TV receiver thus far described is conventional and an exemplary receiver is described in detail in RCA Television Service Data, Chassis CTC-107, File 1981 C-2 and Supplement 1981 C-2-S2, published by RCA Corporation, Consumer Electronics, Indianapolis, Ind., which data is incorporated herein by reference.

Bar display generator 44 develops an on-screen tuning display. In FIG. 2, TV picture program information 70 is displayed on TV screen 60. A tuning indication, for example, vertical bar 62 is also displayed on screen 60, at least at selected times. Channel numerals 66 for VHF-TV channels 2–13 and channel numerals 68 for UHF-TV channels 14–83 are provided on panel 64 proximate to screen 60. Bar 62 is moved leftward and rightward so that its position relative to channel numerals 66 and 68 indicates the channel number of the selected TV channel. So that bar 62 appears uniform, uncontaminated and accentuated, picture information 70 is blanked on the portion of screen 60 where bar 62 is displayed. This is indicated in FIG. 2 by the gap in picture 70 where it intersects with bar 62. The blanked portion of the TV picture is moved leftward and rightward responsive to the tuning voltage so as to substantially coincide with bar 62.

As a result, the bar display is not contaminated by any video information in the underlying TV picture. Merely applying a high drive level to a selected driver, or minimizing or maximizing the luminance signal, only serves to emphasize the color or reduce the degree of contamination depending upon the video signal level. It does not eliminate the underlying picture information as does the blanking arrangement of the present invention described below.

Bar display generator 44 develops control signal VC for positioning bar 62 on screen 60 and is described in detail with reference to FIG. 3. Tuning voltage VT is proportioned by voltage dividers R1, R3 and R5 shown by way of example as potentiometers. The proportioned VT signals at the intermediate points of R1, R3 and R5, at which their wiper arms are positioned, are respectively coupled to node N1 through switches S1, S3 and S5. S1, S3 and S5 are rendered respectively conductive by bandswitch signals V-LO-VHF, V-HI-VHF and V-UHF when the selected TV signal is included in the lower VHF, upper VHF or UHF bands, respectively.

In similar fashion, offsetting potentials are developed at node N2 when the potential at the respective wiper arms of potentiometers R2, R4 and R6, developed from operating potential +V, is coupled to node N2 by switches S2, S4 and S6. S2, S4 and S6 are rendered respectively conductive by the aforementioned band signals.

Amplifier DA combines the proportioned tuning voltage at node N1 and the offsetting voltage at N2 to develop control signal VC which is coupled through diode D to the control terminal of variable one-shot 80 (monostable multivibrator). Amplifier DA modifies the proportioned tuning voltage at N1 by a factor $-RF/RI$ and the offsetting voltage at N2 by a factor $[1+(RF/RI)]$, where RI and RF are the values of resistances RI and RF.

In particular, where bar generator 44 of FIG. 3 employs a CD4098B dual monostable multivibrator COS/MOS integrated circuit, available from RCA Solid-State Division, Somerville, N.J., for one-shots 80 and 82, control signal VC has about a 1.5 volt range as developed at diode D. Switches S1–S6 employ CD4016B quad bilateral switch COS/MOS integrated circuits also available from RCA Solid-State Division. The greatest magnitude control signal VC positions bar 62 near the left edge of screen 60; decreases therefrom move bar 62 towards the right edge of screen 62.

For low VHF channels 2–6, potentiometer R2 is adjusted to position bar 62 at numeral "2" of indicia 66 when channel 2 is selected. With channel 6 selected, potentiometer R1 is adjusted to proportion VT so that bar 62 as at numeral "6" of indicia 66. For high VHF channels 7–13, R4 is adjusted so that the offsetting potential developed at N2 causes bar 62 to be positioned at numeral "7" (not shown) of indicia 66 when channel 7 is selected. With channel 13 selected, R2 is adjusted to position bar 62 at numeral "13."

For UHF channels 14–83, R6 is adjusted to position bar 62 at numeral "14" of indicia 68 when channel 14 is selected; R5 is adjusted to position bar 62 at numeral "83" with channel 83 selected.

Variable one-shot 80 develops a trigger pulse signal at its output connection. The beginning of the trigger pulse signal substantially coincides with the synchronization pulse received from sync substitutor 48; the termination of the trigger pulse signal is delayed from that synchronization pulse by a time period determined by the magnitude of the control signal received from the cathode of diode D. The delay time is shorter than the period of the horizontal deflection signal. Resistor RX and capacitor CX are connected between +V and ground, and determine the maximum duration of the trigger pulse. The control signal VC reduces that duration by restricting the range of voltage over which CX is charged and discharged.

One-shot 82 produces a pulse signal at its output connection which commences at the termination of the trigger signal from one-shot 80 and which has a duration directly controlled by a signal from control source CS. Commonly, control source CS supplies a fixed magnitude control signal so that the pulse signal from one-shot 82 is of substantially constant time duration and is substantially shorter than the period of the horizontal deflection signal. The bar pulse signal from one-shot 82 is desirably of about 0.6 microseconds duration to determine the width of the bar display and is generated between about 2 and 58 microseconds after a synchronization signal is received from 48 so to position the bar display between the left- and right-hand edges of the displayed picture. That bar pulse signal is developed and applied to an input of AND gate 84 irrespective of whether a bar is to be displayed or not.

When a tuning indication is to be displayed, a BAR ON signal is applied to the other input of AND gate 84 so that the bar pulse signal developed by one-shot 82 is coupled to node N3. Generation of the BAR ON signal is described in detail later. The bar pulse is applied to common-emitter NPN driver transistor T1 via its base resistor RB1 and is coupled through resistor RC1 as a BLANKING signal. The BLANKING signal in accordance with a feature of the present invention is applied to video processor 16. With respect to FIG. 21 of the CTC-107 Service Data referred to above, for example, it is satisfactory that the BLANKING signal be applied at the base of vertical blank transistor Q702 or that it be inverted and applied at TP806. The timing of the BLANKING signal is responsive to tuning voltage VT by the operation of one-shot 80.

When the TV channel selected for viewing is in either the upper or lower portion of the VHF band, the appropriate one of band signals V-LO-VHF and V-HI-VHF are applied through OR-gate 87 to an input of AND gate 88 so that the bar pulse signal at node N3 passes via resistor RB3, driver transistor T3 and resistor RC3 to develop a RED color video signal to produce a red-colored bar display. Similarly, if the selected TV channel is in the UHF band, band signal V-UHF is applied to an input of AND gate 86 so that bar pulses from N3 cause resistor RB2, driver T2 and resistor RC2 to develop GREEN color video signals to produce a green-colored bar display. Because viewer settings of brightness, contrast and color controls (not shown) operate on video processor 16, those settings do not affect the RED and GREEN color video signals developed by T2 and T3 and applied directly at the R and G connections to kine driver 18. As a result, bar 62 is of predetermined brightness and color unaffected by viewer controls. By way of example, the RED color video signal can be applied to the emitter of RED driver transistor Q5001 and the GREEN color video signal can be applied to the emitter of GREEN driver transistor Q5002, both shown in FIG. 22 of the CTC-107 Service Data referred to above.

The bar display can be inhibited under certain conditions so that degradation of its appearance does not occur. For example, signal $\overline{VS}$ applied via AND gate 89 inhibits both RED and GREEN color video signals during vertical retrace. By way of further example, the RED and GREEN color video signals are inhibited by AND gate 91 in response to band change signal BC when the tuning system changes from one band to another, such as between the VHF and UHF bands, and in response to mid-band reset signal $\overline{MBR}$ when the tuner changes over the gap between channels 6 and 7 in the VHF band. As a result, the position of the bar display is not changed in a confusing manner due to transients of tuning voltage VT or of the bandswitch voltages when the tuning system changes between bands or between portions of the VHF band.

A bar tuning display is desired whenever tuning is being performed and for a short time, for example, four seconds, thereafter, as well as on viewer demand. To that end, one-shot 42 in FIG. 1 develops the BAR ON signal for a four-second period responsive to a RECALL signal developed, for example, by the viewer depressing a pushbutton. While channel tuning is in process, horizontal synchronization signals HS are unavailable from received TV signals. Sync validity detector 40 compares the average level of received synchronization signal HS against a threshold level to develop a $\overline{SYNC\ VALID}$ indication which is present during tuning. One-shot 42 develops the BAR ON signal continuously so long as $\overline{SYNC\ VALID}$ signal is applied and for four seconds after the $\overline{SYNC\ VALID}$ signal is removed when valid synchronization signals are detected.

To avoid bar display tuning indication 62 from being jagged or erratic owing to the absence of an adequate sync signal, sync substitutor 48 ensures that appropriate synchronization signals are always applied to horizontal oscillator 26. To that end, oscillator 46 develops secondary horizontal synchronization signals SHS at the standard horizontal frequency of 15,575 Hz which are applied to sync substitutor 48, as are received horizontal synchronization signals HS when they are present. With respect to the detailed diagram of sync substitutor 48 shown as part of FIG. 3, $\overline{SYNC\ VALID}$ signal is applied to AND gate 92, and is inverted and applied as SYNC VALID signal to AND gate 94. As a result, synchronization signal HS is applied to NOR gate 96 when HS is present and valid, and synchronization signal SHS is applied to NOR gate 96 when HS is not present or not valid. NOR gate 96, resistor RC4 and inverting buffer amplifier transistor T4 together comprise an OR gate to generate synchronization signals applied to horizontal oscillator 26.

The tuning indicator described above is relatively simple and thus low in cost. In addition, the displayed bar is accentuated and made perceptibly clearer as a result of the elimination of the display of video information on the portion of the TV screen where, and when, the bar is generated. This improvement obtains in accordance with a feature of the invention by having the blanked portion of the TV picture responsive to the tuning voltage. The bar display is made to track the blanked portion of the TV picture. This result is beneficially achieved without disturbing the inherent simplicity and low cost of the bar-type tuning indicator. Moreover, the simple addition of a sync substituter preserves the appearance of the displayed bar when a station is being acquired, also without substantially disturbing the simplicity of the display indicator.

Modifications are contemplated to the present invention which should be limited in scope solely by the claims following. For example, the present invention is equally satisfactory whether used in conjunction with black and white or color TV receivers and may employ either a horizontal or vertical bar-type display of tuning information.

While control source CS of FIG. 3 is described as supplying a fixed control signal to one-shot 82, it is equally satisfactory that CS supply a control signal variable in response to another parameter to be displayed. For example, the strength of the received signal which is readily determinable from the magnitude of AGC voltage developed by IF processor 12 can be applied by CS to vary the width of bar 62.

Additionally, the BLANKING signal developed in accordance with the present invention can be applied at different circuit points in a TV receiver different from those described above. For example, it is also satisfactory to apply the BLANKING signal from T1 to the respective bases of the common-base amplifier transistors in kine driver 18, e.g., Q5001, Q5002 and Q5003 in FIG. 22 of the CTC-107 Service Data referred to above, and to apply RED and GREEN signals to the electrodes of kinescope 20.

What is claimed is:
1. In a television (TV) receiver which receives TV signals in a plurality of frequency bands and which includes tuning means for developing a tuning signal to select one of said TV signals, processing means for developing video signals responsive to said selected TV signal, deflection means for developing a periodic deflection signal responsive to said selected TV signal, and display means for displaying a picture responsive to said video signals and to said deflection signal, apparatus comprising:
blanking means responsive to said tuning signal for eliminating the display of a portion of said picture, which means includes
delay means responsive to said tuning signal for developing a trigger signal delayed in time from a predetermined condition of said deflection signal, which time delay is related to said tuning signal and is shorter than the period of said deflection signal,
pulse generation means responsive to said trigger signal for generating a pulse signal having a time duration substantially shorter than the period of said deflection signal, and
first driver means responsive to said pulse signal and coupled to said processing means for inhibiting said video signals from being applied to said display means during said pulse signal duration, whereby the display of the portion of said picture during said pulse signal duration is eliminated; and tuning indicator means for causing a tuning indication signal to be displayed on said display means within the blanked portion of said picture during said pulse signal duration, which means includes second driver means responsive to said pulse signal for applying said tuning indication signal to said display means unaffected by said video signals during said pulse signal duration.

2. The apparatus of claim 1 wherein said delay means comprises a monostable multivibrator having a control terminal for controlling the delay time thereof, and means for applying a control signal responsive to said tuning signal to said control terminal.

3. The apparatus of claim 2 wherein said monostable multivibrator has a trigger terminal, further including means for applying a synchronization pulse included in said deflection signal as the predetermined condition thereof to said trigger terminal.

4. The apparatus of claim 1 wherein said pulse generating means comprises a monostable multivibrator receiving said trigger signal at a trigger terminal thereof and receiving a control signal at a control terminal thereof.

5. The apparatus of claim 4 wherein said control signal is a substantially fixed signal for making said pulse signal of predetermined time duration.

6. The apparatus of claim 1 wherein said first driver means applies a blanking signal developed from said pulse signal to said processing means for inhibiting the developing of video signals by said processing means.

7. The apparatus of claim 1 wherein said second driver means includes coupling means interposed between said processing means and said display means for coupling said video signals therebetween, and wherein said blanking means applies a blanking signal developed from said pulse signal to said coupling means to inhibit said coupling of said video signals and to develop said tuning indication signal.

8. The apparatus of claim 1 wherein said deflection means includes:

means for developing first synchronization signals responsive to said selected TV signal when said selected TV signal is present;

means for developing second synchronization signals independently of said selected TV signal;

comparison means for determining when said first synchronization signals are present; and switch means responsive to said comparison means for including said first synchronization signal in said deflection signal when said first synchronization signal is present and for including said second synchronization signal in said deflection signal when said first synchronization signal is not present.

9. The apparatus of claim 8 wherein said switch means comprises:

first and second AND gates respectively receiving said first and second synchronization signals at respective first input terminals thereof and each receiving a comparison signal developed by said comparison means at respective second input terminals thereof; and an OR gate receiving signals from respective output terminals of said first and second AND gates at its first and second input terminals and supplying synchronization signals at its output terminal.

10. In the TV receiver of claim 1 wherein said TV receiver is a color TV receiver wherein said tuning means includes means for developing band signals to indicate the one of said frequency bands which includes said selected TV channel, wherein said processing means develops color video signals, and wherein said display means displays a color picture responsive to said color video signals; and said second driver means develops said tuning indication signal including a color video signal responsive to said band signal for causing the display of said tuning indicator signal to be of predetermined color to indicate the one of said frequency bands which includes said selected TV signal.

* * * * *